April 19, 1932. M. G. FARRAR ET AL 1,854,893
GAS DISTRIBUTION SYSTEM
Filed Aug. 13, 1928
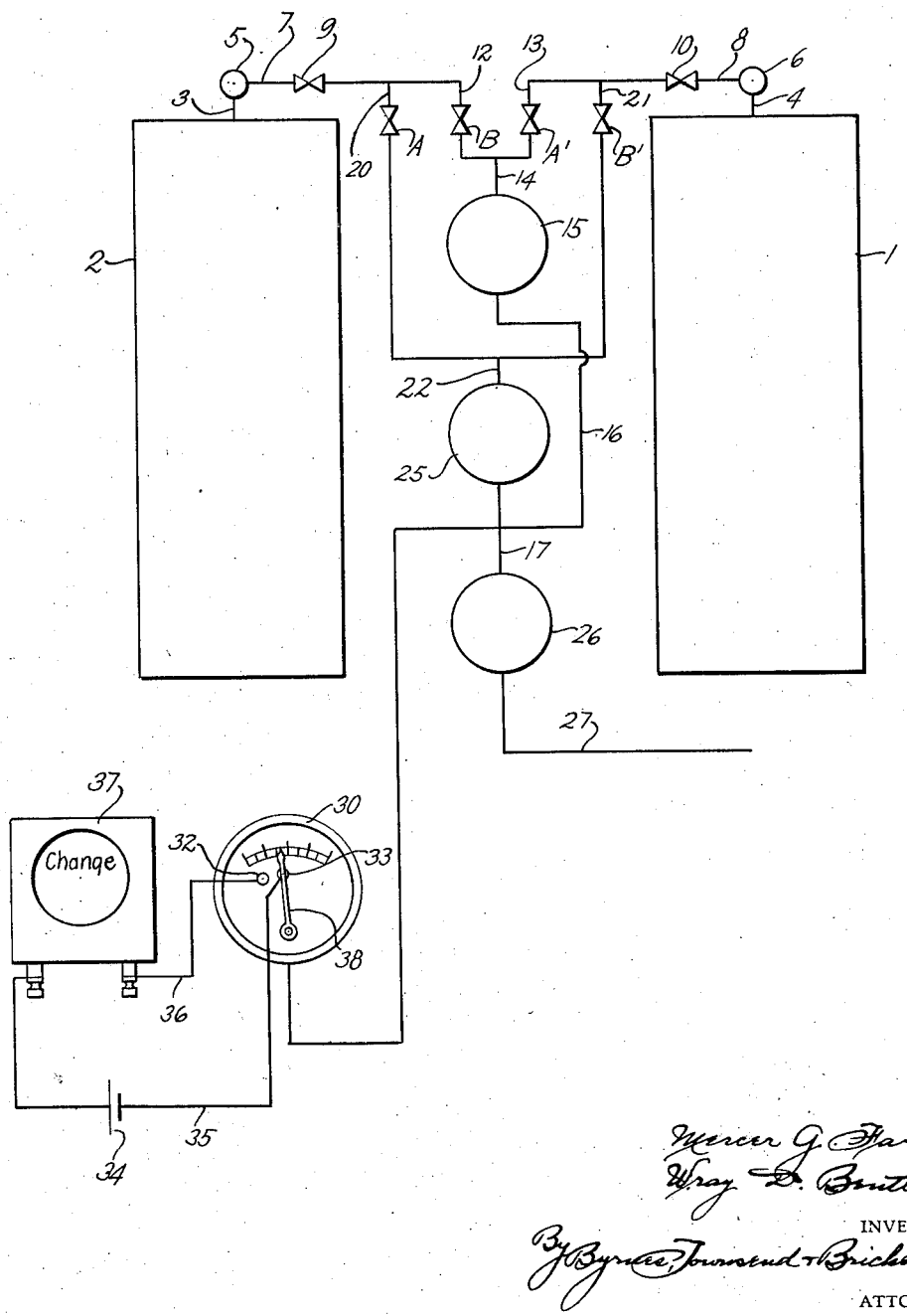

Patented Apr. 19, 1932

1,854,893

UNITED STATES PATENT OFFICE

MERCER G. FARRAR, OF SCARSDALE, NEW YORK, AND WRAY D. BENTLEY, OF BLOOMFIELD, NEW JERSEY, ASSIGNORS TO NATIONAL CARBON CO., INC., A CORPORATION OF NEW YORK

GAS DISTRIBUTION SYSTEM

Application filed August 13, 1928. Serial No. 299,325.

Our invention relates to gas regulating and supply systems and especially to a system for supplying the gas from containers in which the gas is confined at a high pressure and for delivering a constant supply of gas at lower pressures such as the pressures which may be utilized for combustion purposes.

Heretofore, it has been the practice to use cylinders of compressed fuel gas until the gas was exhausted to a low pressure and then to discontinue the supply and replace the used cylinders with freshly charged cylinders. This intermittent supply of gas is an annoyance where the gas is used in connection with continuous heating processes. The interruption caused by substituting fresh tanks for exhausted ones results in losses of time and harmful effect on the products which are being heat treated.

It is one of the objects of our invention to provide a system of gas supply in which freshly charged tanks of compressed gas may be substituted for exhaust tanks without interrupting the gas discharge pressure.

Another object of our invention is to provide an automatic means for discontinuing the flow of gas from a service supply when a predetermined discharge pressure is reached and means for indicating when the supply tank ceases to deliver gas at such a predetermined pressure.

Another object of our invention is to provide a reserve supply of gas which will automatically become operative and supply gas to the system when a predetermined pressure in the discharge pipe is reached.

The sole figure of the drawing is a diagrammatic representation of our invention comprising a gas distribution system. Tanks 1 and 2 in which fuel or other gas is compressed at a high pressure, as for example 200 pounds per square inch, are provided with outlet pipes 3 and 4 and with stop cocks 5 and 6 in the outlets for closing the tanks. Pipes 7 and 8 are connected to the stop cocks 5 and 6 by any suitable means such as unions (not shown). Valves 9 and 10 in the pipes 7 and 8 are used to prevent the escape of gas when a new tank is substituted for an exhausted tank and to permit the changing of cylinders without interrupting the operation of the system.

A Y-shaped connection having one branch 12 connected to the pipe 7 and another branch 13 connected to the pipe 8 meet in the pipe 14 and communicate therethrough with a pressure regulating valve 15. The pressure regulating valve 15 is arranged to reduce the pressure of the gas flowing from the tank and to deliver it through a pipe 16 to a service pressure pipe 17 at intermediate pressures, as for example a pressure not lower than 5 pounds per square inch and not higher than 10 pounds per square inch. When the valve 15 is regulated for these pressures it delivers gas at 10 pounds per square inch until the pressure of the gas in the tank is reduced. It then delivers the gas at pressures between 5 and 10 pounds per square inch until the pressure of 5 pounds per square inch is reached in the service supply pipe 17 and then remains open.

A Y-shaped connection having one branch 20 connected to the pipe 7 and another branch 21 connected to the pipe 8 meet in a pipe 22 and communicate therethrough with a low pressure regulating valve 25. The regulating valve 25 is constructed to deliver gas from a reserve tank to the pipe 17 at the pressure which valve 15 is adjusted to remain open, as for example 5 pounds per square inch and to continue to operate at the latter pressure until the pressure in the pipe 17 is increased above this lower pressure.

Valves A, B, A' and B', are situated in pipes 20, 12, 13 and 21 respectively to control the supply of gas, to the reducing valves 15 and 25. Assuming that the tanks 1 and 2 are fully charged and it is desired to utilize tank 1 as the service reservoir and tank 2 as the reserve reservoir, the valves 6, 10 and A' and the valves 5, 9 and A are opened. The valves B and B' are closed. The high pressure gas from tank 1 flows through pipes 8 and 13 to the reducing valve 15 and may be discharged into the pipes 16 and 17 at the maximum service supply pressure, say, 10 pounds per square inch. The passage from tank 2 is closed by the valve 25 as long as the pressure in service supply pipe 17 is above the minimum service supply pressure, say, 5 pounds per square inch. When the tank 1 is exhausted to the point where the delivery pressure of valve 15 is reduced below 10 and above 5 pounds per square inch the gas continues to flow until the pressure is reached at which valve 25 begins to deliver gas to the service supply pipe 17.

A pressure gauge 30 is connected to the service supply pipe 17. The gauge 30 is provided with an electrical contact or other means which is arranged to operate an audible or visible signal when the minimum service pressure in pipe 17 is reached. The gauge 30 also may be provided with a visible indicator so that the pressure in the pipe 17 may be determined at any time. Such a minimum pressure signaling and indicating means may consist of terminals 32 and 33 connected to opposite sides of a primary battery 34 through wires 35 and 36. An electromagnet in the casing 37 is connected in series in line 36 so that when the circuit is closed the magnetized core will operate a visible or audible signal. The terminal 32 is located so that the circuit will close through the terminal 33 on a pointer 38 when the pressure in the pipe 17 is 5 pounds per square inch.

When the minimum service pressure in pipe 17 is reached, the gas from tank 2 will be conducted through pipes 7 and 20 through reducing valve 25 and will be discharged into the service supply pipe 17 at the minimum service pressure.

In order to reinstate a new gas supply, the valves B and B' are opened and valves A and A' are closed so that the flow of gas will not be interrupted. As connected in this manner, the cylinder 2 constitutes the supply cylinder and the cylinder 1 constitutes the reserve cylinder. From cylinder 2 gas is conducted to the service supply pipe 17 at the maximum service supply pressure, through the pipes 7, 12 and 14 and the reducing valve 15. A freshly charged cylinder may now be substituted for the cylinder 1. For this purpose the valve 10 is closed and a newly charged tank is substituted for the tank 1. Then, the valve 10 is opened and the freshly charged cylinder 1 constitutes the reserve tank and is connected to the low pressure reducing valve 25 through the pipes 8, 21 and 22.

In a fuel gas system, the gas is usually discharged to the burners at a lower pressure than that in the service supply pipe, as for example 4 ounces per square inch. For this purpose the service supply of gas in pipe 17 is passed through a service reducing valve 26 which is arranged to discharge gas at the desired pressure to the pipe 27 and to a combustion device, not shown.

Our invention is not limited to the precise modification shown and described, as various modifications in the arrangement of the parts may be made without departing from our invention. Therefore, we do not wish to limit our invention except by the prior art and by the invention as defined in the annexed claims.

We claim as our invention:

1. A gas distribution system comprising two sources of gas supply; a high pressure regulator, a conduit for conducting gas from each source of supply to the high pressure side of said regulator; a low pressure regulator, a conduit for conducting gas from each source of supply to the high pressure side of the low pressure regulator; means in said conduits for alternately connecting either one of the sources of supply directly to the high pressure side of each regulator and disconnecting the other source, and a common service supply conduit connected to the low pressure side of each of the regulators for equalizing the gas pressure in the low pressure side of the regulators.

2. A gas distribution system comprising two sources of gas supply; a high pressure regulator and a low pressure regulator for automatically controlling the pressure of the gas discharged therefrom, each regulator having a high pressure and a low pressure side; a conduit extending between the low pressure side of each regulator for conducting gas therebetween and to equalize the pressure in the low pressure side of each regulator, and means adapted to alternately place each of said sources of supply in direct communication with the high pressure side of each regulator.

3. A gas distribution system comprising two sources of gas supply; a high pressure regulator and a low pressure regulator for automatically controlling the pressure of the gas discharged therefrom, each regulator having a high pressure and a low pressure side; a common conduit for conducting gas directly connected with the low pressure side of each regulator; a service supply conduit for conducting gas connected to said first conduit, and a service pressure regulator for automatically controlling the pressure of the gas discharged therefrom interposed between said first and second conduits; separate means adapted to alternately connect and disconnect each of said sources of gas supply to and from the high pressure side of each of said high and low pressure regulators; said means comprising a separate main conduit extending from each source of supply, a shut-off valve in each main conduit, each of said main conduits having two branches, one branch conduit of each main conduit extending to the high pressure side of said high pressure regulator and the other branch of each main conduit extending to the high pressure side of the low pressure regulator, and a shut-off valve in each of said branch conduits.

In testimony whereof we affix our signatures.

MERCER G. FARRAR.
WRAY D. BENTLEY.